US012608294B2

(12) United States Patent
Sanuki et al.

(10) Patent No.: US 12,608,294 B2
(45) Date of Patent: Apr. 21, 2026

(54) CHIP HEAT TREATMENT SYSTEM

(71) Applicant: Kioxia Corporation, Tokyo (JP)

(72) Inventors: Tomoya Sanuki, Yokkaichi Mie (JP);
Hitomi Tanaka, Ota Tokyo (JP);
Hajime Sano, Katsushika Tokyo (JP);
Tatsuro Hitomi, Yokohama Kanagawa
(JP); Yasuhito Yoshimizu, Kawasaki
Kanagawa (JP); Kazuma Hasegawa,
Kamakura Kanagawa (JP)

(73) Assignee: Kioxia Corporation, Tokyo (JP)

( * ) Notice: Subject to any disclaimer, the term of this
patent is extended or adjusted under 35
U.S.C. 154(b) by 0 days.

(21) Appl. No.: 18/749,161

(22) Filed: Jun. 20, 2024

(65) Prior Publication Data

US 2024/0428875 A1 Dec. 26, 2024

(30) Foreign Application Priority Data

Jun. 21, 2023 (JP) ................................. 2023-101708

(51) Int. Cl.
*G06F 11/30* (2006.01)
*G06F 11/00* (2006.01)
(52) U.S. Cl.
CPC ........ *G06F 11/3058* (2013.01); *G06F 11/002*
(2013.01)
(58) Field of Classification Search
CPC .......................... G06F 11/3058; G06F 11/002
See application file for complete search history.

(56) References Cited

U.S. PATENT DOCUMENTS 5,226,812 A * 7/1993 Sakata .................... C30B 33/00
432/241
6,291,799 B1 * 9/2001 Heyer ................... H10F 71/137
118/724

(Continued)

FOREIGN PATENT DOCUMENTS

JP H02-249292 A 10/1990
JP 2000-223830 A 8/2000
JP 2009-165700 A 7/2009

OTHER PUBLICATIONS

S. Moss, "Startup proposes robotic data centers with no humans",
Data-Centre Dynamics Ltd (DCD), Jul. 26, 2016 6 pages, URL:
https://www.datacenterdynamics.com/en/news/startup-proposes-
robotic-data-centers-with-no-humans/.

(Continued)

*Primary Examiner* — Joseph D Torres
(74) *Attorney, Agent, or Firm* — Kim & Stewart LLP

(57) ABSTRACT

A system includes a rack, a heat treatment device configured
to perform a heat treatment, one or more conveyance
devices, and a host. The host is configured to determine a
target memory chip to be subjected to the heat treatment by
the heat treatment device among memory chips in a plurality
of drives mounted on the rack, and disable communication
with a target drive on which the target memory chip is
mounted. The host is configured to control the conveyance
devices to dismount the target drive from the rack, detach a
component including the target memory chip from the target
drive, convey the detached component to the heat treatment
device, reattach the component including the target memory
chip that has undergone the heat treatment to a drive, and
mount the drive with the component including the target
memory chip that has undergone the heat treatment on the
rack.

20 Claims, 11 Drawing Sheets

(56) References Cited

U.S. PATENT DOCUMENTS

| | | | |
|---|---|---|---|
| 8,344,475 B2 | 1/2013 | Shaeffer et al. | |
| 9,875,062 B2 | 1/2018 | Yadav et al. | |
| 9,946,471 B1 | 4/2018 | More et al. | |
| 10,289,343 B2 | 5/2019 | Yadav et al. | |
| 2007/0122936 A1* | 5/2007 | Park | H01L 21/67115 |
| | | | 438/77 |
| 2011/0299317 A1 | 12/2011 | Shaeffer et al. | |
| 2013/0185487 A1 | 7/2013 | Kim et al. | |
| 2014/0301142 A1 | 10/2014 | Stoev et al. | |
| 2014/0347936 A1 | 11/2014 | Ghaly | |
| 2017/0090822 A1 | 3/2017 | Yadav et al. | |
| 2017/0277629 A1 | 9/2017 | Li | |
| 2018/0314613 A1 | 11/2018 | Nahum et al. | |
| 2021/0240388 A1 | 8/2021 | Hazeghi et al. | |
| 2023/0282289 A1 | 9/2023 | Sanuki et al. | |
| 2024/0014062 A1 | 1/2024 | Hitomi et al. | |

OTHER PUBLICATIONS

M. Isberto, "Are Artificial Intelligent Robots the Future of Data Center Security?", Future of Data Center Security: Artificial Intelligent Robotics, Colocation America, U.S.A, Dec. 11, 2020, 8 pages, URL: https://www.colocationamerica.com/blog/robots-of-the-future.

Olis Robotics, "Olis Robotics and Olympus Controls Evaluate Developing Remotely Operated AI-Robots Capable of New Levels of Precision in Dynamic Environments", Olis Robotics, Jul. 1, 2019, 3 pages, URL: https://www.globenewswire.com/en/news-release/2019/07/01/1876714/0/en/OLIS-ROBOTICS-AND-OLYMPUS-CONTROLS-EVALUATE-DEVELOPING-REMOTELY-OPER-ATED-AI-ROBOTS-CAPABLE-OF-NEW-LEVELS-OF-PRECISION-IN-DYNAMIC-ENVIRONMENTS.html.

Alibaba Cloud Sea, "Al-Powered Inspection Robots and Intelligent Data Center Maintenance", published on Nov. 10, 2020, 1 page.

* cited by examiner

*FIG. 3*

FIG. 5
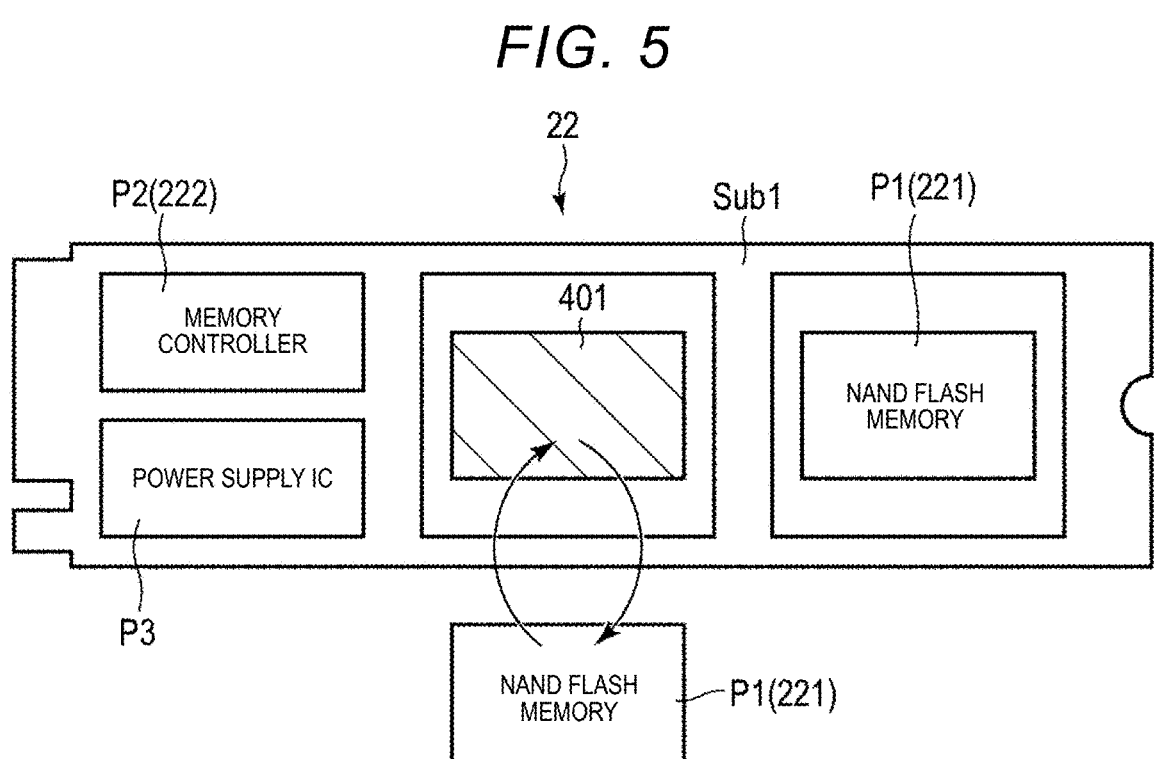
FIG. 6A
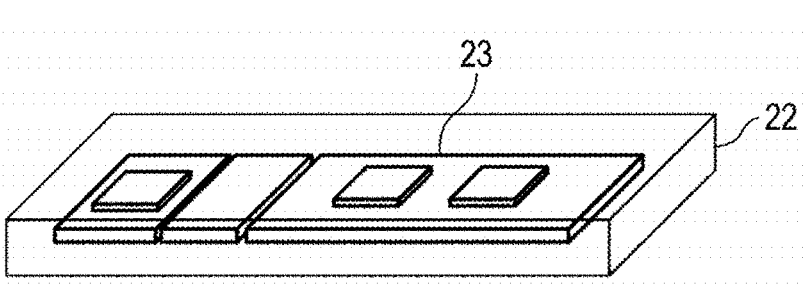
FIG. 6B

DEGREE OF DETERIORATION OF PERFORMANCE

PERFORMANCE SETTING VALUE (VALUE THAT BECOMES EOL)

THE NUMBER OF TIMES OF OPERATION →

DEGREE OF DETERIORATION OF PERFORMANCE

PERFORMANCE SETTING VALUE

RECOVERY BY HIGH-TEMPERATURE ANNEALING TREATMENT

THE NUMBER OF TIMES OF OPERATION →

BEFORE RECOVERY ANNEALING

AFTER RECOVERY ANNEALING
(NORMAL)

AFTER RECOVERY ANNEALING
(ABNORMAL 1)

AFTER RECOVERY ANNEALING
(ABNORMAL 2)

FIG. 13A

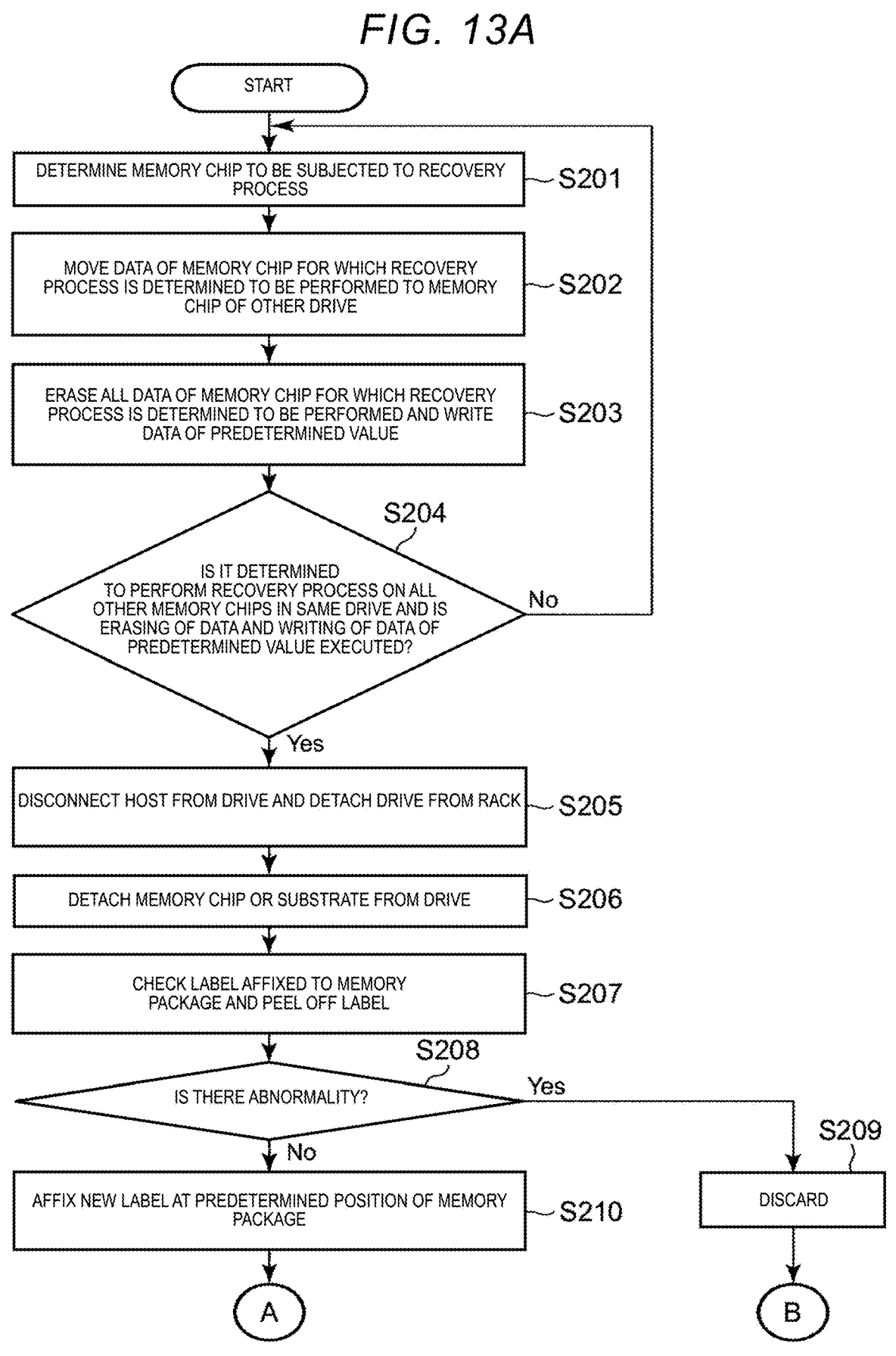

```
                    ┌──────────────┐
                    │    START     │
                    └──────┬───────┘
                           │◄─────────────────────────────┐
                           ▼                               │
    ┌─────────────────────────────────────────┐           │
    │ DETERMINE MEMORY CHIP TO BE SUBJECTED    │           │
    │ TO RECOVERY PROCESS              ├─ S201  │           │
    └──────────────────┬──────────────────────┘           │
                       ▼                                   │
    ┌─────────────────────────────────────────┐           │
    │ MOVE DATA OF MEMORY CHIP FOR WHICH       │           │
    │ RECOVERY PROCESS IS DETERMINED TO BE     ├─ S202     │
    │ PERFORMED TO MEMORY CHIP OF OTHER DRIVE  │           │
    └──────────────────┬──────────────────────┘           │
                       ▼                                   │
    ┌─────────────────────────────────────────┐           │
    │ ERASE ALL DATA OF MEMORY CHIP FOR WHICH  │           │
    │ RECOVERY PROCESS IS DETERMINED TO BE     ├─ S203     │
    │ PERFORMED AND WRITE DATA OF              │           │
    │ PREDETERMINED VALUE                      │           │
    └──────────────────┬──────────────────────┘           │
                       ▼         S204                      │
                 ╱───────────╲                             │
               ╱   IS IT       ╲                           │
             ╱  DETERMINED TO    ╲                         │
           ╱  PERFORM RECOVERY     ╲     No                │
          ╱ PROCESS ON ALL OTHER    ╲────────────────────┘
          ╲ MEMORY CHIPS IN SAME    ╱
           ╲ DRIVE AND IS ERASING  ╱
             ╲ ...                ╱
               ╲────────┬──────╱
                        │ Yes
                        ▼
    ┌─────────────────────────────────────────┐
    │ DISCONNECT HOST FROM DRIVE AND DETACH    ├─ S205
    │ DRIVE FROM RACK                          │
    └──────────────────┬──────────────────────┘
                       ▼
    ┌─────────────────────────────────────────┐
    │ DETACH MEMORY CHIP OR SUBSTRATE          ├─ S206
    │ FROM DRIVE                               │
    └──────────────────┬──────────────────────┘
                       ▼
    ┌─────────────────────────────────────────┐
    │ CHECK LABEL AFFIXED TO MEMORY            ├─ S207
    │ PACKAGE AND PEEL OFF LABEL               │
    └──────────────────┬──────────────────────┘
                       ▼        S208
                 ╱───────────╲          Yes
               ╱ IS THERE      ╲──────────────────┐
               ╲ ABNORMALITY?  ╱                  │  S209
                 ╲─────┬─────╱                    ▼
                       │ No              ┌────────────────┐
                       ▼                 │   DISCARD      │
    ┌──────────────────────────────┐     └───────┬────────┘
    │ AFFIX NEW LABEL AT           ├─ S210        │
    │ PREDETERMINED POSITION OF    │              ▼
    │ MEMORY PACKAGE               │            ( B )
    └──────────────┬───────────────┘
                   ▼
                 ( A )
```

CHIP HEAT TREATMENT SYSTEM

CROSS-REFERENCE TO RELATED APPLICATION

This application is based upon and claims the benefit of priority from Japanese Patent Application No. 2023-101708, filed Jun. 21, 2023, the entire contents of which are incorporated herein by reference.

FIELD

Embodiments described herein relate generally to a system, more specifically a chip heat treatment system.

BACKGROUND

In recent years, a storage device including a non-volatile memory is widely used. As one of such storage devices, a solid state drive (SSD) including a NAND-type flash memory is known. In recent years, a case in which an SSD is used in a data center is increased.

Characteristics of the flash memory deteriorate as the number of program (P)/erase (E) cycles increases. When the required performance is not achieved due to the deterioration in the characteristics due to increase in the number of P/E cycles, the flash memory reaches an end of life (EOL). Therefore, in a data center in which a large number of SSDs are used, maintenance work, such as replacement of the flash memory, by a maintenance person may frequently occur.

BRIEF DESCRIPTION OF THE DRAWINGS

FIG. 3 is a block diagram showing a configuration example of a drive according to the embodiment.

FIG. 5 is a diagram showing an example of a module configuration of the drive according to the embodiment.

FIGS. 6A and 6B are diagrams showing mounting examples of a memory chip or a substrate in the drive according to the embodiment.

FIG. 13A is a first flowchart showing an operation procedure related to the recovery process of the memory chip including the temperature management by the label in the system according to the embodiment.

DETAILED DESCRIPTION

Embodiments provide a system capable of continuously using a flash memory.

In general, according to an embodiment, a chip heat treatment system includes a rack on which a plurality of drives is mountable, a heat treatment device configured to perform a heat treatment, one or more conveyance devices, and a host. The host is configured to perform writing and reading of data with respect to one or more memory chips in each of the drives mounted on the rack. The host is configured to determine a target memory chip to be subjected to the heat treatment by the heat treatment device among memory chips in the plurality of drives mounted on the rack, and disable communication with a target drive on which the target memory chip is mounted. The host is configured to control the one or more conveyance devices to dismount the target drive from the rack, detach a component including the target memory chip from the target drive, convey the detached component to the heat treatment device, reattach the component including the target memory chip that has undergone the heat treatment to a drive, and mount the drive with the component including the target memory chip that has undergone the heat treatment on the rack. The host is configured to start communication with the mounted drive.

Hereinafter, embodiments will be described with reference to the drawings.

Figure 1:
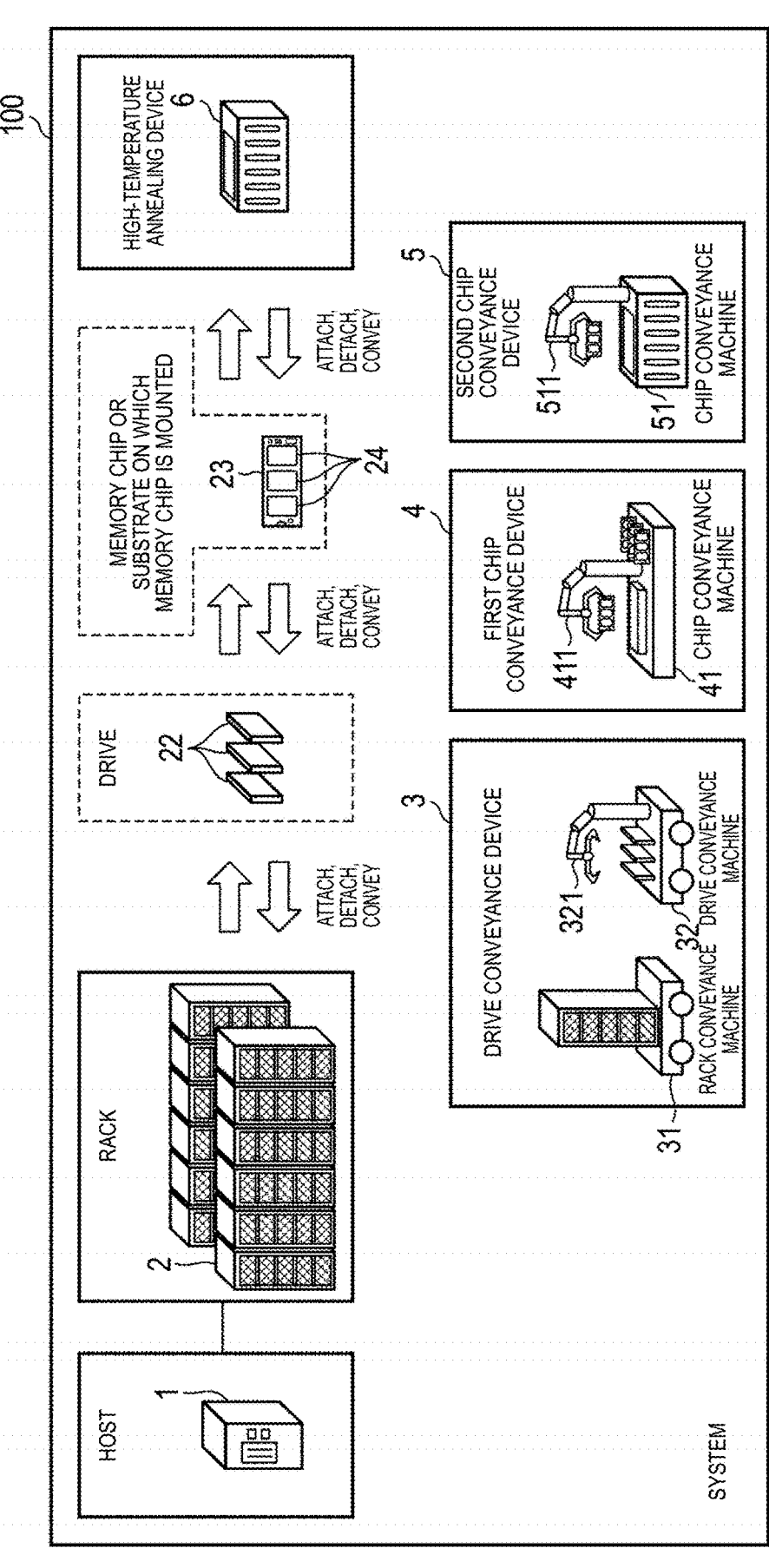
FIG. 1 is a diagram showing a configuration example of a system according to an embodiment.

FIG. 1 is a diagram showing a configuration example of a system 100 according to an embodiment. The system 100 according to the embodiment is, for example, a system that is assumed to be used in a data center. The system 100 is also referred to as an information processing system 100.

The system 100 includes a host 1 and a plurality of racks 2 each of which is connected to the host 1.

Figure 2:
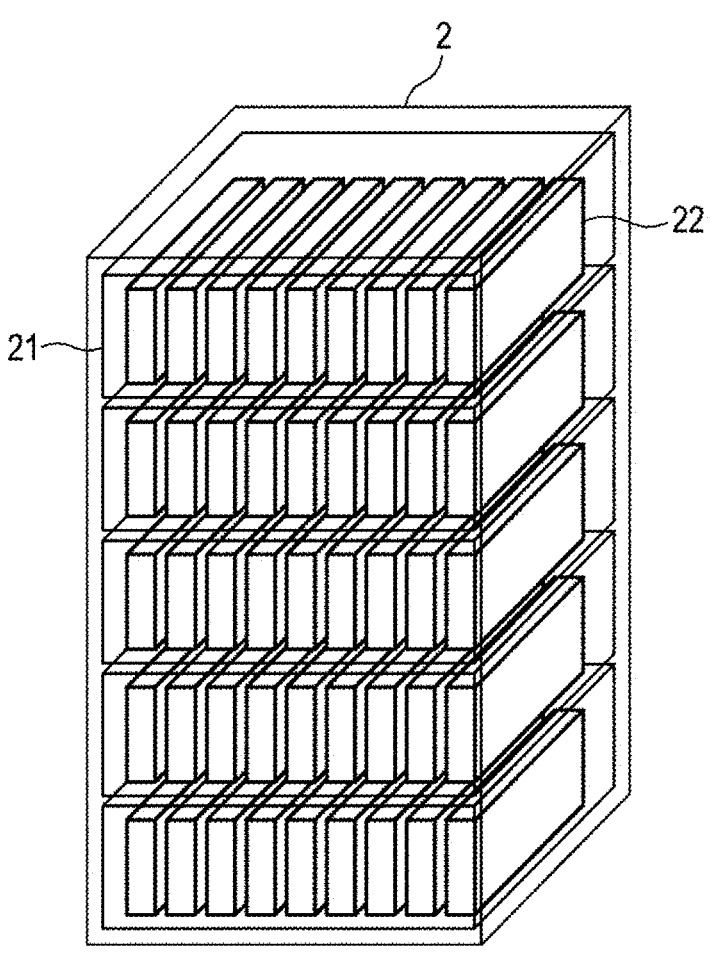
FIG. 2 is a diagram showing a configuration example of a rack according to the embodiment.

The host 1 is an information processing device called a file server or the like. The host 1 is capable of executing writing or reading of data with respect to the plurality of drives 22 mounted on the rack 2 in response to, for example, a write request or a read request of data received from the other information processing device via a network such as the Internet. Here, an example of a case in which the drive 22 is an SSD will be described. FIG. 2 is a diagram showing a configuration example of the rack 2.

The rack 2 has a plurality of slots 21. A plurality of drives 22 may be accommodated in each slot 21. In the system 100, the plurality of drives 22 accommodated in the same slot 21 may be treated as one unit.

In addition, the rack 2 may be provided in a facility capable of maintaining a low temperature of −40° C. or lower or an extremely low temperature of −150° C. or lower in order to operate a memory chip 24 (described below in detail) in the drive 22 in an environment of a low temperature of −40° C. or lower or an extremely low temperature of −150° C. or lower.

It should be noted that, in FIG. 1, an example is shown in which the host 1 is provided separately from the rack 2 for clear understanding of the host 1, but the host 1 may be accommodated in one or more of the slots 21 of the rack 2. In this case, the host 1 may be accommodated in a plurality of slots 21 continuously provided in the vertical direction. The host 1 accommodated in a certain rack 2 can execute not only writing or reading of data to or from the drive 22 in the same rack 2 but also writing or reading of data to or from the drive 22 in the other rack 2. Wiring in the rack 2 and between the racks 2 may be arranged in any applicable manner.

Returning to FIG. 1, the description of the configuration of the system 100 will be continued. The system 100 further includes a drive conveyance device 3, a first chip conveyance device 4, a second chip conveyance device 5, and a high-temperature annealing device 6.

The drive conveyance device 3 is a device that, under the control of the host 1, attaches the drive 22 to the rack 2, detaches the drive 22 from the rack 2, and conveys the drive 22 to be attached to the rack 2 or the drive 22 detached from the rack 2. The drive conveyance device 3 receives an instruction from the host 1, for example, by wireless communication. The drive conveyance device 3 includes one or more rack conveyance machines 31 and one or more drive conveyance machines 32.

The rack conveyance machine 31 is a device that conveys the drive 22 in units of rack 2. It should be noted that, here, an example is shown in which the drive conveyance device 3 includes the rack conveyance machine 31, but the drive conveyance device 3 may include only the drive conveyance machine 32 without including the rack conveyance machine 31.

The drive conveyance machine 32 is a device that detaches the drive 22 from the rack 2 conveyed by the rack conveyance machine 31, attaches the drive 22 to the rack 2, and conveys the drive 22 detached from the rack 2 or the drive 22 to be attached to the rack 2. The drive conveyance machine 32 includes a robot arm 321. The robot arm 321 is capable of attaching or detaching the drive 22 to or from the racks 2 one by one, and also capable of attaching or detaching the drives 22 in the number that may be accommodated in one slot 21 to or from the racks 2 in a batch manner, that is, in the unit described above.

When the drive conveyance device 3 does not include the rack conveyance machine 31, the drive conveyance machine 32 moves to a location of the rack 2 and detaches the drive 22 from the rack 2 or attaches the drive 22 to the rack 2. It should be noted that, even when the drive conveyance device 3 includes the rack conveyance machine 31, the drive conveyance machine 32 itself is able to move to the location of the rack 2 and detach the drive 22 from the rack 2 or attach the drive 22 to the rack 2.

The first chip conveyance device 4 is a device that, under the control of the host 1, for example, detaches the memory chip 24 or the substrate 23 on which the memory chip 24 is mounted from the drive 22 that is conveyed by the drive conveyance device 3, and attaches the memory chip 24 or the substrate 23 to the drive 22, or conveys the memory chip 24 or the substrate 23 detached from the drive 22 or the memory chip 24 or the substrate 23 to be attached to the drive 22. The first chip conveyance device 4 receives an instruction from the host 1, for example, by wireless communication. The first chip conveyance device 4 includes one or more chip conveyance machines 41. The chip conveyance machine 41 includes a robot arm 411 capable of holding (e.g., grabbing) the memory chip 24 or the substrate 23.

Figure 3:
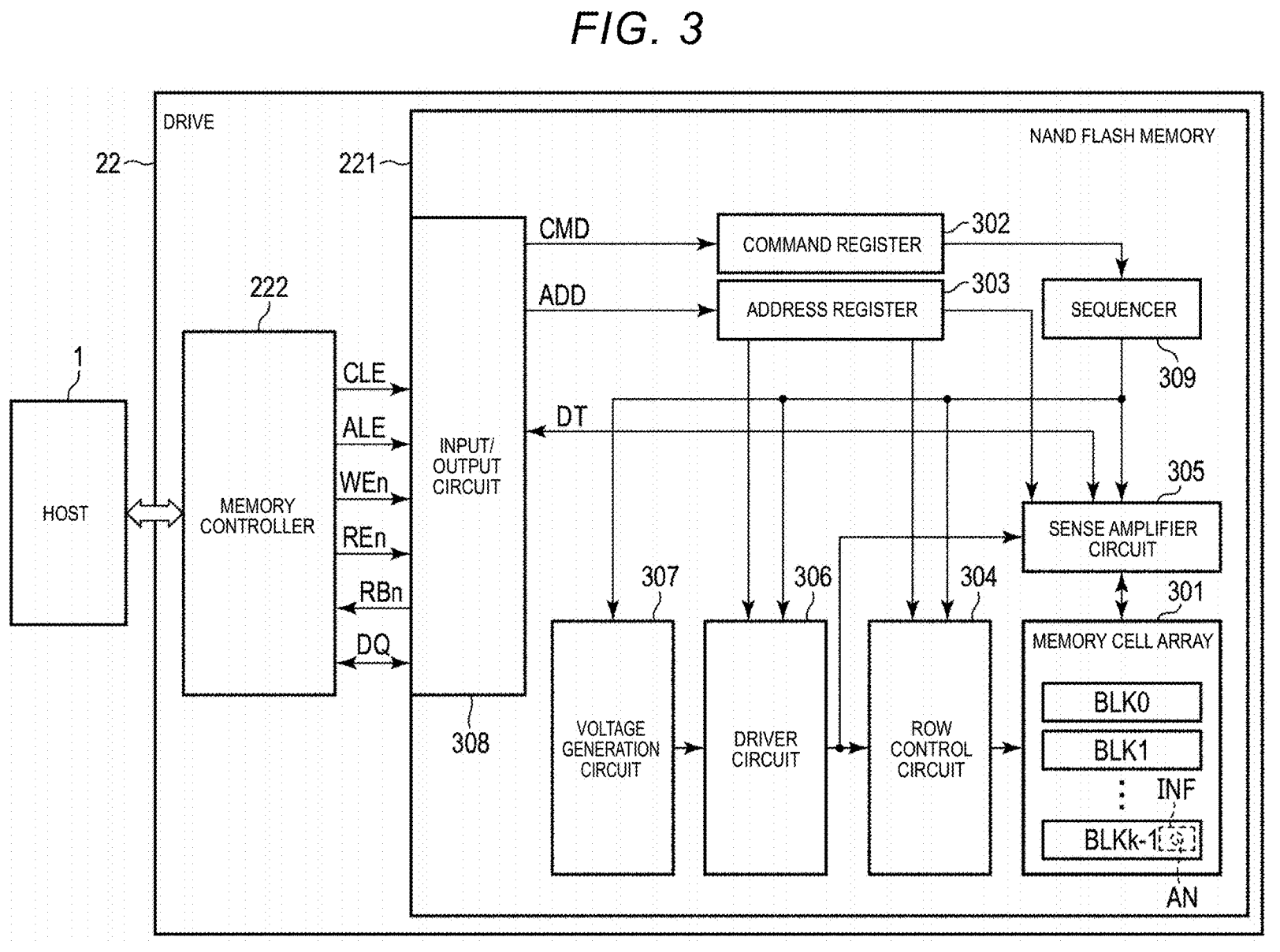

FIG. 3 is a block diagram illustrating one configuration example of the drive 22.

The drive 22 is connected to the host 1 via the host bus. The drive 22 may be requested to write data into, read out data from, and erase data from the host 1.

The host bus is, for example, a bus based on an interface standard, such as an SD™ interface, a serial attached small computer system interface (SCSI) (SAS), a serial advanced technology attachment (ATA) (SATA), a peripheral component interconnect express (PCIe), or a non-volatile memory express (NVMe). The drive 22 may be connected to the host 1 by wireless communication.

The drive 22 includes a NAND flash memory 221 and a memory controller 222.

The memory controller 222 is electrically connected to the NAND flash memory 221. The memory controller 222 transmits a command CMD, an address information ADD, and a plurality of control signals to the NAND flash memory 221.

The NAND flash memory 221 is a non-volatile semiconductor memory device. The NAND flash memory 221 is an aggregate of one or more memory chips 24.

The NAND flash memory 221 receives the command CMD, the address information ADD, and the plurality of control signals. Data DT is transferred between the NAND flash memory 221 and the memory controller 222. The data DT transferred from the memory controller 222 to the NAND flash memory 221 during a write sequence is referred to as write data DT. The write data DT is written in the NAND flash memory 221. During a read sequence, data DT transferred from the NAND flash memory 221 to the memory controller 222 is referred to as read data DT. The read data DT is read out from the NAND flash memory 221.

The NAND flash memory 221 includes, for example, a memory cell array 301, a command register 302, an address register 303, a row control circuit 304, a sense amplifier circuit 305, a driver circuit 306, a voltage generation circuit 307, an input/output circuit 308, and a sequencer 309.

The memory cell array 301 stores data. A plurality of bit lines and a plurality of word lines are provided in the memory cell array 301. The memory cell array 301 includes a plurality of blocks BLK (BLK0, BLK1, . . . , BLKk-1). k is an integer of 2 or more. The block BLK is an aggregate of a plurality of memory cells. Each memory cell is associated with one bit line and one word line. The memory cell array 301 includes a plurality of select gate lines for selecting a control unit in the memory cell array 301.

For example, a certain number of specific blocks BLK in the plurality of blocks BLK store setting information and management information for the operation of the NAND flash memory 221, information INF such as information AN related to the state/situation of the NAND flash memory 221, and the like. These pieces of information INF are also referred to as ROM information INF. A block BLK that stores the ROM information INF is also referred to as a ROM block.

The command register 302 stores the command CMD from the memory controller 222. The command CMD is, for example, a signal including an instruction to the sequencer 309 to execute a read sequence, a write sequence, an erase sequence, or the like.

The address register 303 stores the address information (indicating select address) ADD from the memory controller 222. The address information ADD includes, for example, a block address, a page address (e.g., word line address), a column address, and the like. The block address, the page address, and the column address are each used for the selection of the block BLK, the word line, the select gate line, and the bit line. The block selected based on the block address is referred to as a selected block. The word line selected based on the page address is referred to as a selected word line.

The row control circuit 304 controls the operation with respect to the row of the memory cell array 301. The row control circuit 304 selects one block BLK in the memory cell array 301 based on the block address in the address register 303. The row control circuit 304 transfers, for example, a voltage applied to a wiring corresponding to the selected word line to the selected word line of the selected block. The row control circuit 304 controls the selection and the non-selection of the select gate line based on the address information ADD. The row control circuit 304 includes a block decoder, a word line decoder, a select gate line decoder, a switch circuit, and the like.

The sense amplifier circuit 305 controls an operation with respect to a column of the memory cell array 301. In the write sequence, the sense amplifier circuit 305 applies a voltage to each of the bit lines provided in the memory cell array 301 in accordance with the write data DT from the memory controller 222. In the read sequence, the sense amplifier circuit 305 determines the data stored in the memory cell based on the presence or absence of the generation of the current or the fluctuation of the potential of the bit line. The sense amplifier circuit 305 transfers the data based on the determination result to the memory controller 222 as the read data DT. The sense amplifier circuit 305 includes a bit line selection circuit, an amplifier circuit, and the like.

The driver circuit 306 outputs a plurality of voltages used in a read sequence, a write sequence, an erase sequence, and the like to the memory cell array 301. The driver circuit 306 applies a predetermined voltage to the wiring corresponding to the word line, the bit line, and the like based on the address information ADD in the address register 303.

The voltage generation circuit 307 generates a plurality of voltages for various operations of the NAND flash memory 221. The voltage generation circuit 307 outputs the generated voltages to the driver circuit 306.

The input/output circuit 308 functions as an interface circuit on the NAND flash memory 221 side between the NAND flash memory 221 and the memory controller 222. For example, the input/output circuit 308 communicates with the memory controller 222 based on a NAND interface standard such as an open NAND flash interface (ONFi). The command latch enable signal CLE, the address latch enable signal ALE, the write enable signal WEn, the read enable signal REn, the ready/busy signal RBn, the input/output signal DQ, and the like are used for communication between the NAND flash memory 221 and the memory controller 222.

The command latch enable signal CLE is a signal indicating that the input/output signal DQ received by the NAND flash memory 221 is the command CMD. The address latch enable signal ALE is a signal indicating that the input/output signal DQ received by the NAND flash memory 221 is the address information ADD. The write enable signal WEn is a signal for instructing the input of the input/output signal DQ to the NAND flash memory 221. The read enable signal REn is a signal for instructing the output of the input/output signal DQ to the NAND flash memory 221.

The ready/busy signal RBn is a signal for notifying the memory controller 222 from the NAND flash memory 221 of whether the NAND flash memory 221 is in a ready state of receiving the instruction from the memory controller 222 or in a busy state of not receiving the instruction.

The input/output signal DQ is, for example, an 8-bit width signal set. The input/output signal DQ may include a command CMD, address information ADD, write/read data DT, and the like.

The sequencer 309 controls the operation of the entire NAND flash memory 221. For example, the sequencer 309 controls each circuit based on the command CMD in the command register 302.

Figure 4:
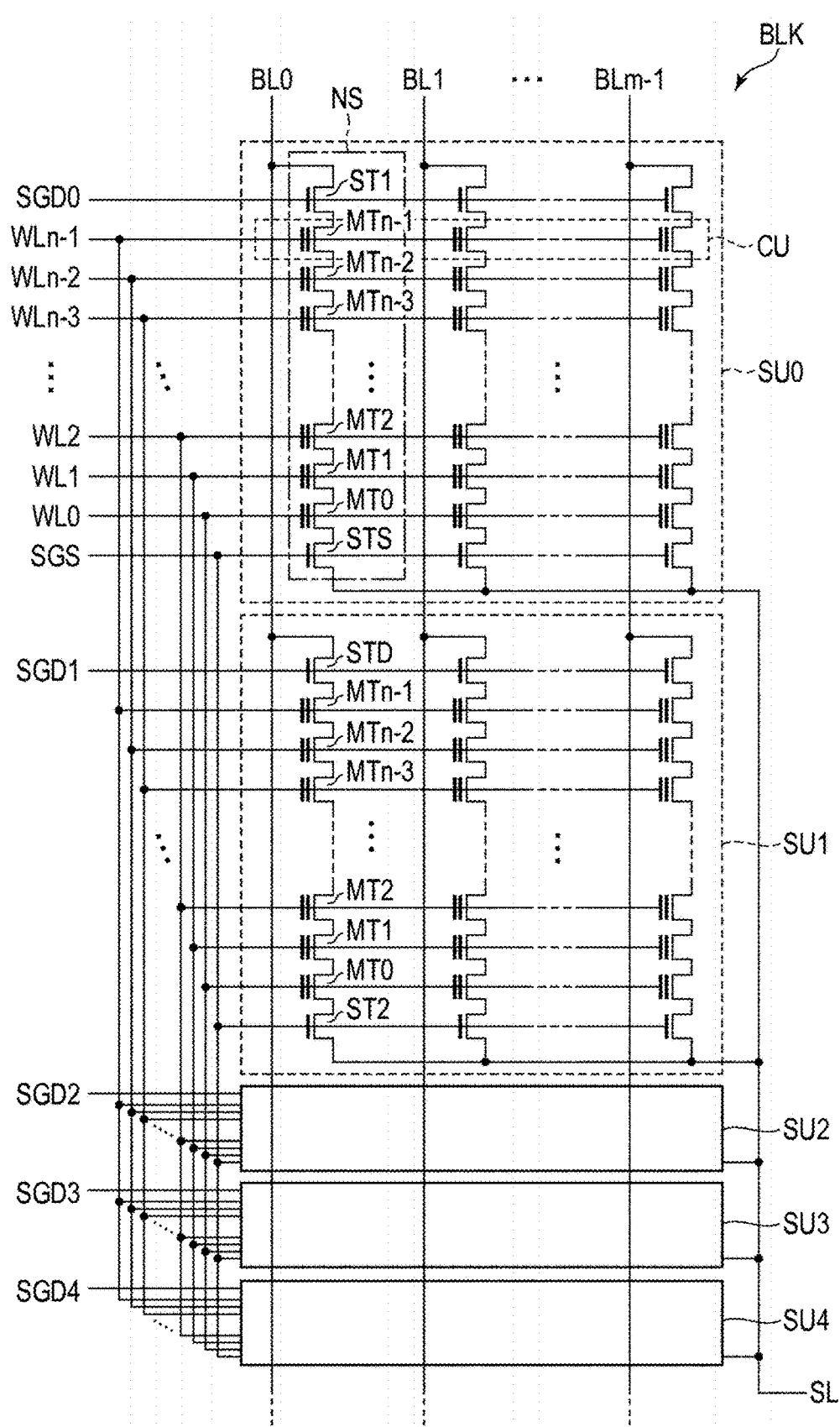
FIG. 4 is a circuit diagram showing a circuit configuration of one block in a memory cell array of the drive according to the embodiment.

FIG. 4 is a circuit diagram showing a circuit configuration of one block BLK in the memory cell array 301.

One block BLK includes a plurality (for example, five) of string units SU (SU0 to SU4). Further, each of the string units SU includes a plurality of NAND strings NS. The number of blocks BLK in the memory cell array 301, the number of string units SU in the block BLK, and the number of NAND strings NS in the string unit SU are optional.

Each of the NAND strings NS includes a plurality of memory cells MT (MT0 to MTn-1) and select transistors STD and STS. n is an integer of 2 or more. The plurality of memory cells MT are connected in series between the source of the select transistor STD and the drain of the select transistor STS.

The memory cell MT substantially stores data in a non-volatile manner. The memory cell (also referred to as a memory cell transistor) MT is a field effect transistor having a control gate and a charge storage layer.

The gate of the select transistor STD in each of the string units SU0 to SU4 is connected to each of the corresponding one of the plurality of drain side select gate lines SGD0 to SGD4.

The gate of the select transistor STS in each of the string units SU0 to SU4 is commonly connected to, for example, the source side select gate line SGS. The gate of the select transistor STS may be connected to the select gate line SGS different for each of the string units SU0 to SU4.

The control gates of the memory cells MT0 to MTn-1 belonging to the same block BLK are connected to each of the corresponding one of the plurality of word lines WL (WL0 to WLn-1).

In the memory cell array 301, the drain of the select transistor STD of the NAND string NS belonging to the same column is connected to each of the corresponding one of the plurality of bit lines BL (BL0 to BL(m−1)). m is an integer of 2 or more. The sources of the plurality of select transistors STS are commonly connected to the source line SL.

The string unit SU is an aggregate of NAND strings NS that are connected to different bit lines BL and connected to the same select gate line SGD. In each string unit SU, a set of memory cells MT commonly connected to the same word line WL (memory cell group) is also referred to as a cell unit CU (or a memory group). The block BLK is an aggregate of a plurality of string units SU that share the plurality of word lines WL. The memory cell array 301 is an aggregate of a plurality of blocks BLK that share the plurality of bit lines BL.

FIG. 5 is a diagram showing an example of a module configuration of the drive 22.

The drive 22 includes a plurality of packaged devices P1, P2, and P3. The plurality of packaged devices P1, P2, and P3 are provided on the module substrate Sub1.

The packaged device P1 is a semiconductor packaged device of the NAND flash memory 221. The packaged device P1 is also referred to as a memory package P1. The memory package P1 includes the memory chip 24 and may or may not include a substrate 23.

The packaged device P2 is a semiconductor packaged device of the memory controller 222. The packaged device P2 is also referred to as a controller package P2.

The packaged device P3 is, for example, a semiconductor packaged device of a power supply IC. The packaged device P3 is also referred to as a power supply IC package P3. The power supply IC package P3 supplies various voltages to the memory package P1 and the controller package P2. For example, the power supply IC package P3 includes a regulator circuit, a direct current-alternating current conversion circuit, and a protection circuit.

The memory package P1 is connected to the controller package P2 and the power supply IC package P3 via a wiring provided on the front surface of the module substrate Sub1 or inside of the module substrate Sub1.

The memory package P1 is configured to be attachable to and detachable from the module substrate Sub1. The memory package P1 is connected to the module substrate Sub1 via a connector 401 on the module substrate Sub1.

FIGS. 6A and 6B are diagrams showing mounting examples of the memory chip 24 or the substrate 23 in the drive 22.

FIG. 6A shows an example of the drive 22 in which a socket is provided inside the drive 22 to which the memory chip 24 is detachably attached. When the drive 22 is a drive shown in FIG. 6A, the chip conveyance machine 41 performs the work for each memory chip 24. Specifically, the chip conveyance machine 41 attaches the memory chip 24 to the drive 22 or detaches the memory chip 24 from the drive 22.

Meanwhile, FIG. 6B shows an example of a drive 22 in which a slot is provided inside drive 22 to which the substrate 23 is detachably attached. One or more memory chips 24 are mounted on the substrate 23. When the drive 22 is a drive shown in FIG. 6B, the chip conveyance machine 41 performs the work for each substrate 23. Specifically, the chip conveyance machine 41 attaches the substrate 23 to the drive 22 and detaches the substrate 23 from the drive 22.

When the high-temperature annealing device 6, which will be described below, includes both the connector to which the memory chip 24 is connectable and the connector to which the substrate 23 is connectable, the system 100 is also capable of using the drive 22 shown in FIG. 6A and the drive 22 shown in FIG. 6B in combination. In this case, the first chip conveyance device 4 may include the chip conveyance machine 41 that performs the work for each memory chip 24, and the chip conveyance machine 41 that performs the work for each the substrate 23, or the chip conveyance machine 41 may be configured to perform the work for each memory chips 24 or the work for each substrates 23.

Returning to FIG. 1, the description of the configuration of the system 100 will be continued.

The second chip conveyance device 5 is a device that, under the control of the host 1, attaches the memory chip 24 or the substrate 23 detached from the drive 22 by the first chip conveyance device 4 to the high-temperature annealing device 6, detaches the memory chip 24 or the substrate 23 from the high-temperature annealing device 6, and conveys the memory chip 24 or the substrate 23 to be attached to the high-temperature annealing device 6 or the memory chip 24 or the substrate 23 detached form the high-temperature annealing device 6. The second chip conveyance device 5 receives an instruction from the host 1, for example, by wireless communication. The second chip conveyance device 5 includes one or more chip conveyance machines 51. The chip conveyance machine 51 includes a robot arm 511 capable of holding (e.g., grubbing) the memory chip 24 or the substrate 23.

Similarly to the first chip conveyance device 4 described above, the second chip conveyance device 5 may include a chip conveyance machine 51 that performs the work for each memory chip 24 and a chip conveyance machine 51 that performs the work for each substrate 23, or the chip conveyance machine 51 may be configured to perform the work for either the memory chip 24 or the substrate 23.

The high-temperature annealing device 6 is a device that performs a high-temperature annealing treatment on the memory chip 24 attached by the second chip conveyance device 5 or the memory chip 24 on the substrate 23 attached by the second chip conveyance device 5. The high-temperature annealing device 6 includes one or both of a connector to which the memory chip 24 is connectable and a connector to which the substrate 23 is connectable. The high-temperature annealing device 6 also has a function of performing an operation check of the memory chip 24 on which the high-temperature annealing treatment is performed.

Here, the high-temperature annealing treatment performed by the high-temperature annealing device 6 on the memory chip 24 will be described with reference to FIGS. 7A to 7C. It should be noted that, here, an example is shown in which each memory cell of the memory chip 24 is capable of storing 8-value information of 3 bits.

Each memory cell of the memory chip 24 stores any one of information of 8 types of values of "000", "001", "010", "011", "100", "101", "110", and "111". FIG. 7A shows a threshold voltage distribution of the memory cell before the deterioration in characteristics, for example, a threshold voltage distribution of the memory cell immediately after the start of using the memory chip 24. The vertical axis represents the number of memory cells, and the horizontal axis represents the voltage value. As shown in FIG. 7A, immediately after the start of using the memory chip 24, the distribution widths of the respective information (for example, information on seven types of values of "001" to "111" other than "000") stored in the memory cell are within a certain range in which the distribution widths do not overlap with each other.

Figure 7A:
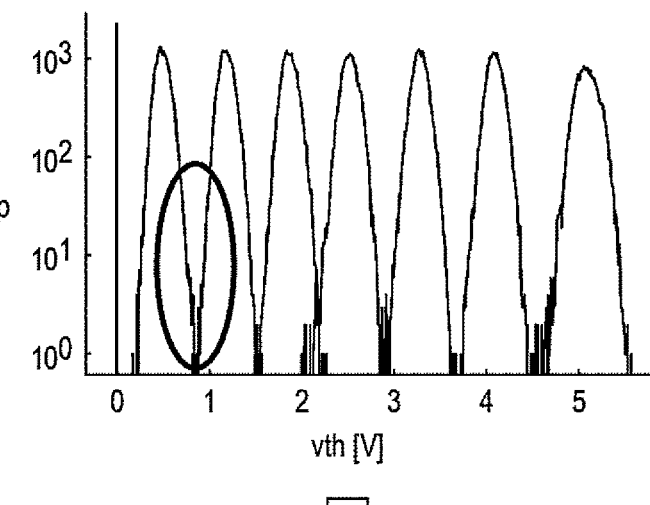
FIGS. 7A to 7C are diagrams illustrating a high-temperature annealing treatment performed by a high-temperature annealing device according to the embodiment.
Figure 7B:
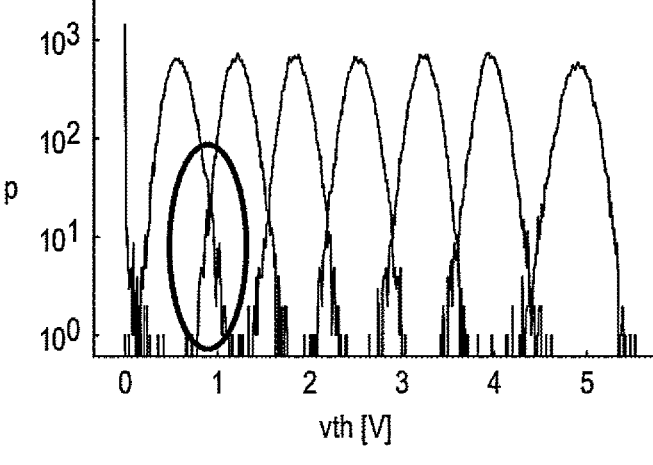
Figure 7B:

FIG. 7B shows a threshold voltage distribution of the memory cell of the memory chip 24 in which the symptoms of the deterioration in characteristics due to increase of the P/E cycles appear. As shown in FIG. 7B, a distribution width of the respective information stored in the memory cell is widened to a degree that the end portions overlap with the distribution of the values of the adjacent values as compared with the threshold voltage distribution of the memory cell shown in FIG. 7A. Therefore, there is an increasing possibility that an error occurs in which information is read out incorrectly as a different value. When the frequency of occurrence of the error increases, for example, the performance of the memory chip 24 deteriorates, as a deterioration in latency or throughput due to an increase in the number of error correction opportunities using an error correction code (ECC), or by having to increase in a parity amount of the ECC. In addition, there is a possibility that overhead processing for preserving information, which is referred to as refresh or the like, may be increased.

Figure 7C:
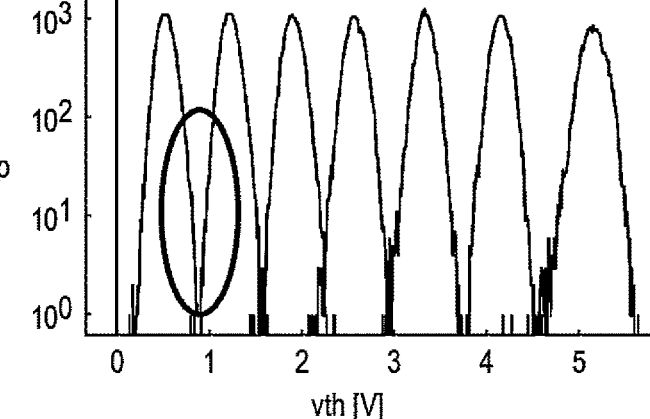

FIG. 7C shows a threshold voltage distribution of the memory cell of the memory chip 24 after the high-temperature annealing treatment is performed with the high-temperature annealing device 6 on the memory chip 24 in of which the symptoms 41 the deterioration in the characteristics due to the increase of P/E cycles appeared.

The high-temperature annealing treatment is performed on the memory chip 24 by heating at a certain temperature for a certain period of time. The temperature is preferably in a range of 125° C. to 250° C. It is preferable that the period of time is shortened inversely with the temperature level, and it is performed from several days to several hours according to the heating temperature. In addition, the high-temperature annealing treatment is preferably repeated a plurality of times.

As shown in FIG. 7C, the distribution width of respective information stored in the memory cell of the memory chip 24 after the high-temperature annealing treatment is returned to the same extent as that of the memory chip 24 immediately after the start of use as shown in FIG. 7A. That is, the high-temperature annealing treatment is capable of recovering the memory chip 24 from the state of deterioration in characteristics due to the increase of P/E cycles. It is known that, in the recovery of the memory chip 24 having deteriorated characteristics by the high-temperature annealing treatment, the effect of the recovery is not lost even when the high-temperature annealing treatment is repeated, and the deterioration in the characteristics is not accelerated. Hereinafter, the high-temperature annealing treatment is also referred to as a recovery process.

In order to continuously use the memory chips 24 in the rack 2, the system 100 according to the embodiment controls the drive conveyance device 3, the first chip conveyance device 4, the second chip conveyance device 5, and the high-temperature annealing device 6 by the host 1. The host 1 includes a processor, a main storage device, a program for controlling the drive conveyance device 3, the first chip conveyance device 4, the second chip conveyance device 5, and the high-temperature annealing device 6, although not shown in FIG. 1. The program may be stored in the drive 22 in the rack 2, and may be loaded from the drive 22 in the rack 2 to the main storage device by the processor at the time of starting up the host 1.

It should be noted that, in FIGS. 7A to 7C, an example of the deterioration in the characteristics in which the distribution width of respective information when each memory cell of the memory chip 24 stores 8-value information of 3 bits is widened is shown. The high-temperature annealing treatment for recovering the memory chip 24 from such a state of the deterioration in the characteristics is also effective when each memory cell of the memory chip 24 stores information of the number of bits other than 3 bits. That is, the memory chip 24 of the system 100 according to the embodiment may store 16-value or 32-value information of 4 bits or 5 bits in each memory cell.

The host 1 that is capable of writing or reading of data with respect to the drive 22 accommodated in the rack 2 is capable of detecting a performance degradation of the memory chip 24 attached to the drive 22 or the memory chip 24 on the substrate 23. When the host 1 detects the memory chip 24 having the performance that falls below a threshold value, the host 1 determines the memory chip 24 to be a target memory chip 24 on which the recovery process is performed.

As an indicator for detecting the performance degradation of the memory chip 24, the host 1 is able to employ a latency or a throughput of reading and writing of data. In addition, the host 1 may employ a frequency of the refresh. Alternatively, the host 1 may employ a parity amount of the ECC.

The host 1 moves the data stored in the memory chip 24, which is the recovery process target, to the other memory chip 24, more specifically, to the memory chip 24 of the other drive 22. After the data is moved, the host 1 erases all data of the memory chip 24, which is the recovery process target, and writes data of a predetermined value to the memory chip 24. It is known that the effect of the recovery by the high-temperature annealing treatment varies depending on the data stored in the memory chip 24 during the high-temperature annealing treatment is performed. The host 1 executes the writing of the data of the predetermined value in order to maximize the effect of recovery by the high-temperature annealing treatment. The predetermined value may be obtained by, for example, a statistical method. It is preferable that the memory chip 24 into which the data of the predetermined value is written has a threshold value of a memory cell that is higher than the erased threshold value and is lower than the highest threshold value in writing of data.

The host 1 determines whether all the other memory chips 24 in the drive 22 in which the memory chip 24 determined to be the recovery process target is mounted has been previously determined to be the recovery process targets, and whether the data has been erased and the data of a predetermined value has been written. For example, when the memory chip 24 that has not been the recovery process target is present in the drive 22, the host 1 transitions to the next detection of the memory chip 24 of which the performance falls below the threshold value.

On the other hand, when, as a result of determining a certain memory chip 24 to be the recovery process target, all memory chips 24 in the drive 22 that mounts the memory chip 24 are determined as the recovery process targets, the host 1 disconnects the connection (e.g., terminates the communication) with the drive 22.

The host 1 issues an instruction to the drive conveyance device 3 to detach the drive 22 from which the connection is disconnected from the corresponding rack 2. The drive conveyance device 3 that received the instruction detaches the designated drive 22 from the rack 2.

As described above, since the plurality of drives 22 accommodated in each slot 21 of the rack 2 can be treated as one unit, the host 1 may use the unit for disconnecting the connection with the drive 22 as the slot 21. That is, when all memory chips 24 in a certain slot 21 are the recovery process targets, the host 1 may issue an instruction to the drive conveyance device 3 to detach the plurality of drives 22 in the slot 21 from the rack 2 as one unit.

Further, when all the memory chips 24 in a certain rack 2 are the recovery process targets, the host 1 may issue an instruction to the drive conveyance device 3 to convey the rack 2 by the rack conveyance machine 31 and to detach all drives 22 from the rack 2 by the drive conveyance machine 32.

Alternatively, the host 1 may determine the memory chip 24 to be the recovery process target based on, for example, an elapsed time from the last high-temperature annealing treatment or a cumulative number of times of the high-temperature annealing treatment, instead of detecting the performance degradation of the memory chip 24 and determining the memory chip 24 to be the recovery process target. In this case, it is also possible to operate such that a plurality of memory chips 24 having the relationship, such as in the same drive 22, in the same slot 21 of the rack 2, or in the same rack 2, are easily collectively determined to be the recovery process targets.

In addition, here, for example, a case is described in which the connection with the drive 22 is disconnected and the drive 22 is detached from the rack 2 at the timing at which all memory chips 24 in a certain drive 22 are the recovery process targets, but the connection with the drive 22 may be disconnected and the drive 22 may be detached from the rack 2 at the timing at which the predetermined number or more of the memory chips 24 in the drive 22 are the recovery process targets. In this case, the host 1 needs only to move the data of the memory chip 24 that is not the recovery process target to the memory chip 24 of the other drives 22 before disconnecting the connection with the drive 22.

Subsequently, the host 1 issues an instruction to the first chip conveyance device 4 to detach the memory chip 24 or the substrate 23 from the drive 22 detached from the rack 2. The first chip conveyance device 4 that received the instruction detaches the memory chip 24 or the substrate 23 from the drive 22.

Next, the host 1 issues an instruction to the second chip conveyance device 5 to attach the memory chip 24 or the substrate 23, which is detached from the drive 22, to the high-temperature annealing device 6. The second chip conveyance device 5 that received the instruction attaches the memory chip 24 or the substrate 23 on the high-temperature annealing device 6.

When the memory chip 24 as the recovery process target or the substrate 23 on which the memory chip 24 as the recovery process target is mounted is attached to the high-temperature annealing device 6, the host 1 issues an instruction to the high-temperature annealing device 6 to perform the high-temperature annealing treatment on the memory chip 24. The high-temperature annealing device 6 that received the instruction performs the high-temperature annealing treatment on the attached memory chip 24. The high-temperature annealing device 6 may receive a designation of a temperature, a time, the number of times, and the like from the host 1 each time, or may apply a predetermined value.

After the high-temperature annealing treatment is completed, the host 1 issues an instruction to the high-temperature annealing device 6 to execute the operation check for the memory chip 24. The high-temperature annealing device 6 that received the instruction executes processing such as writing or reading of the verification data to or from the memory chip 24, for example, and notifies the host 1 of the result.

The high-temperature annealing device 6 may execute the operation check of the memory chip 24 as a part of the high-temperature annealing treatment and notify the result of the operation check together with the completion of the high-temperature annealing treatment. In addition, the high-temperature annealing device 6 executes the erasure of all data of the memory chip 24 after the operation check of the memory chip 24.

When the host 1 confirm that the performance of the memory chip 24 is recovered in response to the notification from the high-temperature annealing device 6, the host 1 issues an instruction to the second chip conveyance device 5 to detach the memory chip 24 or the substrate 23 from the high-temperature annealing device 6, and then issues an instruction to the first chip conveyance device 4 to attach the memory chip 24 or the substrate 23 detached from the high-temperature annealing device 6 to the drive 22. The host 1 may issue an instruction to the first chip conveyance device 4 to return the memory chip 24 or the substrate 23 to the original position before the detachment, or may issue an instruction to the first chip conveyance device 4 to return the memory chip 24 or the substrate 23 to an available position different from the position before the detachment.

On the other hand, when it is found that the performance of the memory chip 24 is not recovered by the notification from the high-temperature annealing device 6, the host 1 issues an instruction to the second chip conveyance device 5 to detach the memory chip 24 or the substrate 23 from the high-temperature annealing device 6, but does not issue an instruction to the first chip conveyance device 4 to attach the memory chip 24 or the substrate 23 detached from the high-temperature annealing device 6 to the drive 22. That is, the host 1 determines to discard the memory chip 24 whose performance is not sufficiently recovered by the high-temperature annealing treatment. When the preliminary memory chip 24 is prepared, the host 1 may issue an instruction to the second chip conveyance device 5 to attach the preliminary memory chip 24 to the drive 22. That is, the memory chip 24 may be replaced.

When the high-temperature annealing treatment is performed on all the memory chips 24 in the drive 22, and the reattachment to the drive 22, including the discarding or the replacement, is completed, the host 1 issues an instruction to the drive conveyance device 3 to attach the drive 22 to the rack 2. The drive conveyance device 3 that received the instruction attaches the drive 22 to the designated slot 21 of the designated rack 2. The host 1 may designate the rack 2 and the slot 21 such that the drive 22 is returned to the original position before the detachment, or may designate the rack 2 and the slot 21 such that the drive 22 is returned to an available position different from the position before the detachment.

When the drive 22 is attached to the rack 2, the host 1 connects the drive 22 to enable writing of data to the drive 22 and reading of data from the drive 22. There is no need to perform the process of returning the data moved to the memory chip 24 of the other drive 22 before the detachment from the rack 2. The host 1 can the storage region of the drive 22 returned to the rack 2 as a free region.

Although FIG. 1 shows one configuration example of the system 100 as if the memory chip 24 is conveyed from the installation place of the rack 2 to the installation place of the high-temperature annealing device 6, the host 1 may control the drive conveyance device 3, the first chip conveyance device 4, the second chip conveyance device 5, and the high-temperature annealing device 6, for example, to move the high-temperature annealing device 6 to a vicinity of the rack 2 in which the memory chip 24 determined as the recovery process target is present.

Figure 8:
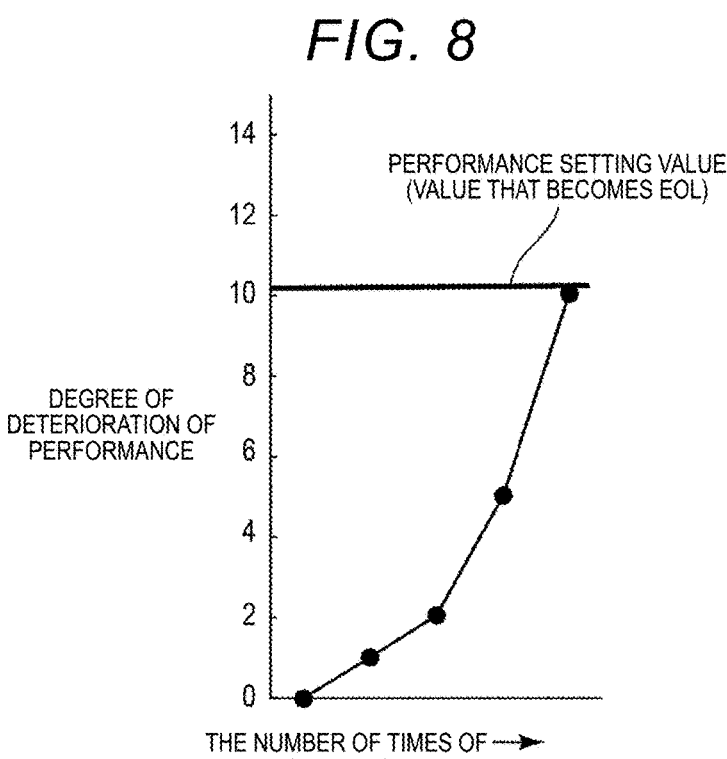
FIG. 8 is a diagram showing a comparative example regarding a transition of a deterioration degree of performance of a memory chip.

FIG. 8 is a diagram showing a comparative example regarding a transition of a deterioration degree of performance of the memory chip 24. The comparative example shows a transition of a deterioration degree of the performance of the memory chip 24 when the operation is continued without ensuring the performance recovery by the high-temperature annealing treatment.

In this comparative example, as the time elapses, the deterioration degree of the performance proceeds, and when the performance deteriorates beyond the performance setting value to be guaranteed by the memory chip 24, the memory chip 24 reaches the level of EOL. The performance setting value of the memory chip 24 is determined such that the operation of a certain number of times or more may be secured based on the transition of the deterioration degree of the performance. Therefore, it is difficult to set the performance setting value of the memory chip 24 to a value corresponding to a state in which the deterioration degree of the performance is low.

Figure 9:
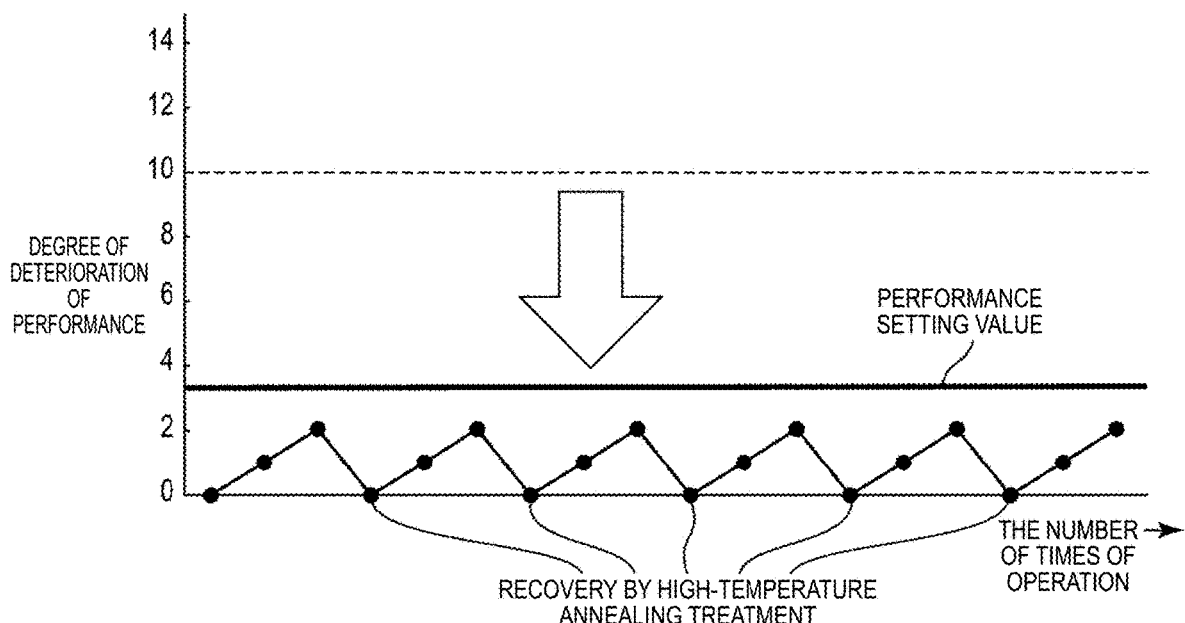
FIG. 9 is a diagram showing a transition of a deterioration degree of performance of the memory chip in the system according to the embodiment.

FIG. 9 is a diagram showing a transition of a deterioration degree of performance of the memory chip 24 in the system 100 according to the embodiment.

In the system 100 according to the embodiment, the host 1 detects, for example, the memory chip 24 in which a sign of performance degradation appears, and determines the memory chip 24 to be a recovery process target. The host 1 controls the drive conveyance device 3, the first chip conveyance device 4, the second chip conveyance device 5, and the high-temperature annealing device 6 to recover the memory chip 24 as a recovery process target from the state of the deterioration in the characteristics. Therefore, the deterioration degree of the performance of each memory chip 24 in the system 100 transitions as shown in FIG. 9.

More specifically, the high-temperature annealing treatment is repeatedly performed at an appropriate timing under the control of the host 1, so that the performance of each memory chip 24 is maintained in a high state. In other words, the system 100 according to the embodiment makes it possible to continuously use the memory chip 24 without causing the memory chip 24 to reach the level of EOL.

As a result, the system 100 according to the embodiment can set the performance setting value of the memory chip 24 to the value corresponding to the state in which the deterioration degree of the performance is low, which is difficult in the comparative example described above.

Figure 10:
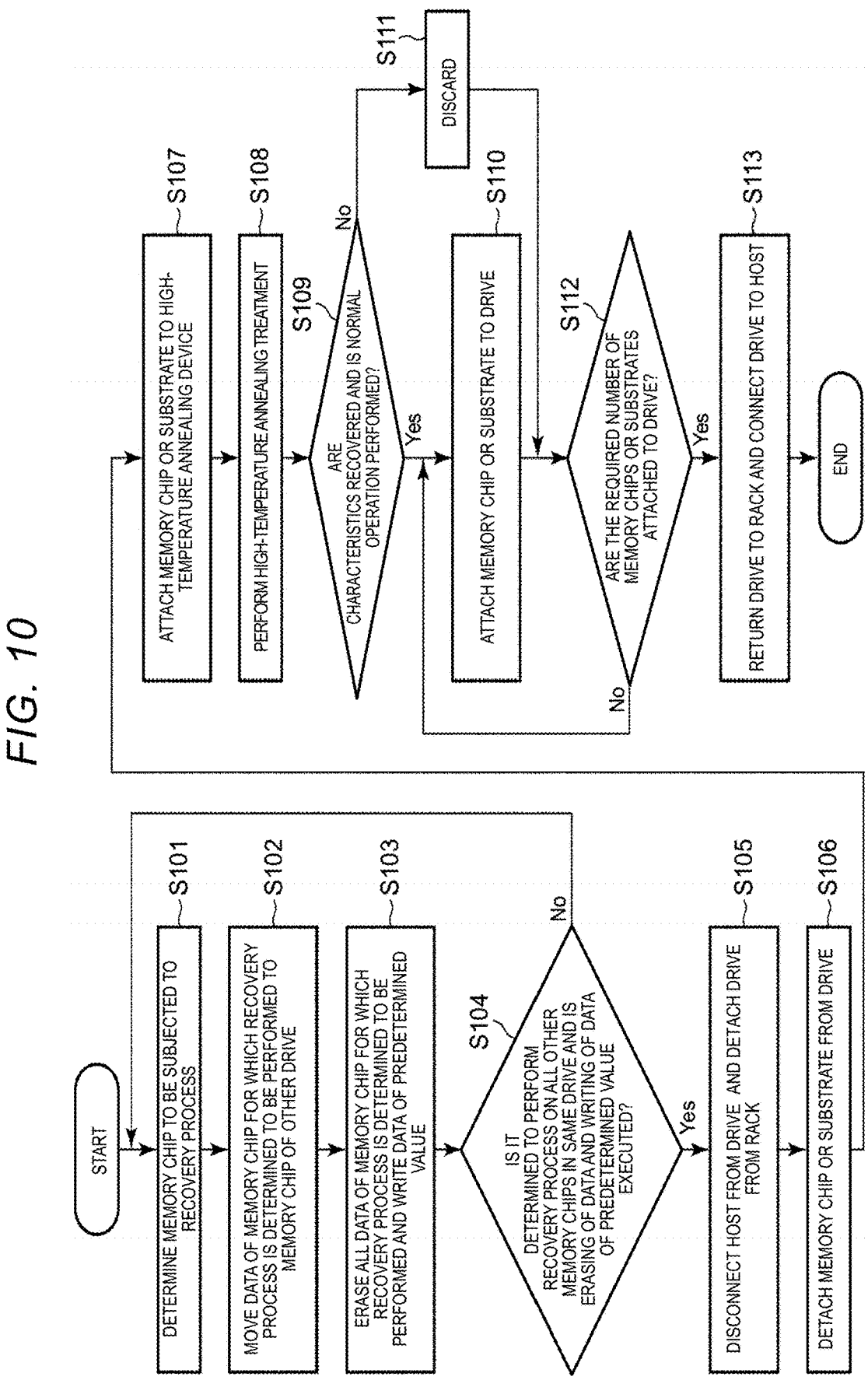
FIG. 10 is a flowchart showing an operation procedure related to a recovery process of the memory chip in the system according to the embodiment.

FIG. 10 is a flowchart showing an operation procedure related to a recovery process of the memory chip 24 in the system 100 according to the embodiment.

The host 1 determines a memory chip 24 to be subjected to the recovery process (S101). The host 1 moves data of the memory chip 24 for which the recovery process is determined to be performed to a memory chip 24 of the other drive 22 (S102). After moving the data, the host 1 erases all data of the memory chip 24 for which the recovery process is determined to be performed, and writes data of a predetermined value (S103).

The host 1 determines whether the recovery process for all other memory chips in the same drive has been performed, and determines whether the erasing of the data and the writing of the data of the predetermined value has already been executed (S104).

For example, when there is the other memory chip 24 for which it is not determined to perform the recovery process (S104: No), the process returns to S101 and the host 1 determines the memory chip 24 for which the recovery process is to be performed. The host 1 executes the process of S102 to S104 with respect to the determined memory chip 24.

On the other hand, when it is determined to perform the recovery process in all other memory chips 24, and the erasing of the data and the writing of the data with the predetermined value have already been executed (S104: Yes), the host 1 disconnects the drive 22 from the host 1 and the drive conveyance device 3 detaches the drive 22 from the rack 2 (S105). Subsequently, the host 1 detaches the memory chip 24 or the substrate 23 from the drive 22 by the first chip conveyance device 4 (S106).

Then, the host 1 controls the second chip conveyance device 5 to attach the memory chip 24 or the substrate 23 to the high-temperature annealing device 6 (S107). The host 1 controls the high-temperature annealing device 6 to perform the high-temperature annealing treatment on the memory chip 24 (S108).

The host 1 determines whether the characteristics of the memory chip 24 are recovered and the memory chip 24 is able to be normally operated after the high-temperature annealing treatment (S109). When the characteristics of the memory chip 24 are not recovered even when the high-temperature annealing treatment is performed (S109: No), the host 1 discards the memory chip 24 (S111). In this case, the host 1 may replace the memory chip 24 with a preliminary memory chip 24. In addition, when the memory chip 24 is mounted on the substrate 23 that is detachably attached to the drive 22 or the high-temperature annealing device 6, the host 1 determines the memory chip 24 to be the recovery process target among the plurality of memory chips 24 mounted on the substrate 23 unusable as the processing of "discarding" in S111. Specifically, the host 1 does not connect the memory chip 24 that is determined to be unusable when the drive 22 is returned to the rack 2. When all the plurality of memory chips 24 mounted on the substrate 23 are unusable, the host 1 discards the substrate 23. In this case, the host 1 may replace the substrate 23 with a preliminary substrate 23.

When the characteristics of the memory chip 24 are recovered by the high-temperature annealing treatment (S109: Yes), the host 1 attaches the memory chip 24 or the substrate 23 to the drive 22 by the first chip conveyance device 4 (S110).

The host 1 determines whether the required number of memory chips 24 or substrates 23 are attached to the drive 22 (S112). When the memory chip 24 or the substrate 23 is insufficient (S112: No), the process returns to S110, and the remaining memory chips 24 or the substrate 23 are attached to the drive 22 by the first chip conveyance device 4.

On the other hand, when the required number of memory chips 24 or substrates 23 are attached to the drive 22 (S112: Yes), the host 1 controls the drive conveyance device 3 to attach the drive 22 to the rack 2 and connect the drive 22 to the host 1 (S113). As described above, when the memory chip 24 that is unusable is present in the drive 22, the host 1 does not connect the memory chip 24.

As described above, in the system 100 according to the embodiment, the host 1 determines the memory chip 24 to be the recovery process target, and controls the drive conveyance device 3, the first chip conveyance device 4, the second chip conveyance device 5, and the high-temperature annealing device 6 to automatically recover the characteristics of the memory chip 24. Therefore, the system 100 according to the embodiment makes it possible to continuously use the memory chip 24 and does not cause maintenance work such as replacement of the memory chip 24 by a maintenance person.

In addition, in the system 100 according to the embodiment, the high-temperature annealing treatment is repeatedly performed at an appropriate timing under the control of the host 1, so that the performance of the memory chip 24 is maintained high, and the performance setting value of the memory chip 24 can be set to a value corresponding to the state in which the deterioration degree of the performance is low.

As described above, when the memory chip 24 or the substrate 23 is returned to the drive 22 by the host 1, the host 1 may issue an instruction to the first chip conveyance device 4 to move the memory chip 24 or the substrate 23 to an available position different from the position before the detachment. Similarly, when the host 1 causes the drive 22 be returned to the rack 2, the host 1 may issue an instruction to the drive conveyance device 3 to move the drive 22 to an available position different from the position before the detachment.

For example, when the host 1 determines a certain memory chip 24 to be a recovery process target and erases data stored in the memory chip 24, the host 1 may issue an erasure certificate for certifying that the erasing of the data is performed by a method in accordance with a predetermined rule, the data is erased by a method in accordance with the predetermined rule.

For example, when the data center using the system 100 according to the embodiment is operated in a manner of providing the data storage service to the plurality of users, the memory chip 24 in the rack 2 allocated to a certain user may also be returned to the rack 2 allocated to the other user through the recovery process.

When the host 1 issues the erasure certificate, the provider of the data storage service is able to clearly indicate to the user that the memory chip 24 in which the user's data remains is not used by others and that the memory chip 24 in which the other's data remains is not used by the user.

Subsequently, in order to confirm that the high-temperature annealing treatment on the memory chip 24 is performed at a predetermined temperature, a temperature management method of the high-temperature annealing treatment using a label that may be adopted in the system 100 according to the embodiment will be described.

Figure 11:
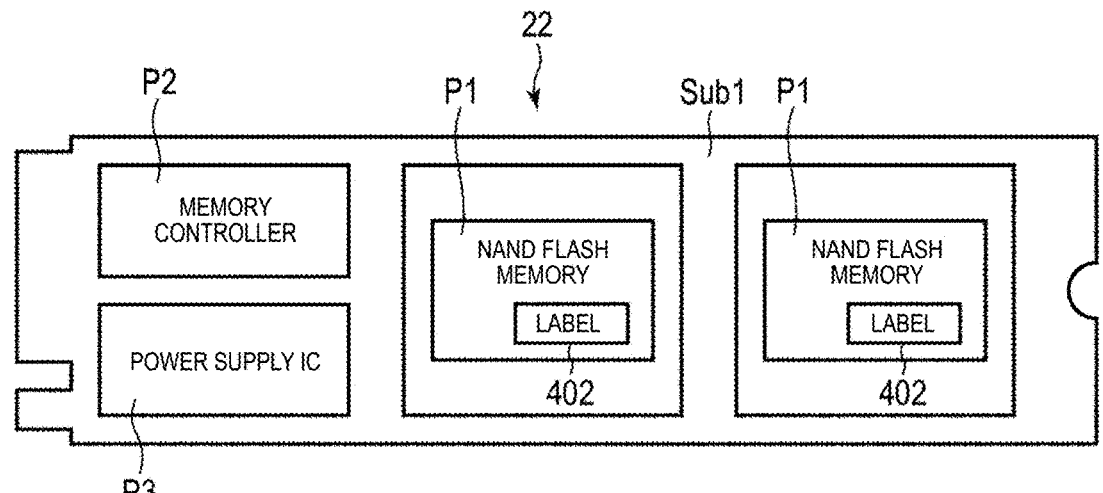
FIG. 11 is a diagram showing an example of affixing a label to a memory package for temperature management of a high-temperature annealing treatment in the system according to the embodiment.

FIG. 11 is a diagram showing one example of affixing a label to the memory package P1 including the memory chip 24.

Before the memory chip 24 or the substrate 23 is attached to the high-temperature annealing device 6 by the second chip conveyance device 5, a worker checks a label 402 that is already affixed on the memory package P1 including the memory chip 24 or the substrate 23. It should be noted that this check may be performed by the second chip conveyance device 5.

The label 402 is provided with a portion that irreversibly changes an indication state depending on the temperature. It is preferable that the portion that changes in temperature includes two or more portions having different temperatures as an indicator. For example, when the high-temperature annealing treatment is set to be performed at a temperature of 200° C. or higher and lower than 210° C., it is preferable that the label 402 includes (1) a portion that changes when the temperature is reached to a temperature lower than the temperature required for the high-temperature annealing treatment, for example, 190° C., (2) a portion that changes when the temperature is reached to a suitable temperature for the high-temperature annealing treatment, for example, 200° C., and (3) a portion that changes when the temperature is reached to a temperature higher than the temperature required for the high-temperature annealing treatment, for example, 210° C. Further, it is preferable that the portion in (1) may also be used for a use of determining whether the memory chip 24 has been used in an environment in which the temperature of the memory chip 24 reaches a temperature (for example, 190° C.) that affects the characteristics of the memory chip 24.

When it is confirmed by the label 402 that the memory chip 24 has not been used in an environment that affects the characteristics of the memory chip 24, the worker uses the label 402 as it is or peels off the label 402 and affixes a new label 402 to the memory package P1. The second chip conveyance device 5 attaches the memory package P1 to which the label 402 is affixed to the high-temperature annealing device 6. When the label 402 is replaced, the replacement of the label 402 may also be performed by the second chip conveyance device 5.

On the other hand, when it is detected by the label 402 that the memory chip 24 has been used in an environment that affects the characteristics of the memory chip 24, the worker inputs error information to the host 1. The host 1 that received the error information instructs to discard the memory package P1 or replace the memory package P1 with a preliminary memory package P1. The input of the error information to the host 1 may also be performed by the second chip conveyance device 5.

After the high-temperature annealing treatment by the high-temperature annealing device 6 is completed and when the memory package P1 is detached from the high-temperature annealing device 6 by the second chip conveyance device 5, the worker checks the label 402 affixed on the memory package P1. As described above, this check may be performed by the second chip conveyance device 5. FIGS. 12A to 12D are diagrams illustrating a transition of a state of the label 402 due to the high-temperature annealing treatment.

Figure 12A:
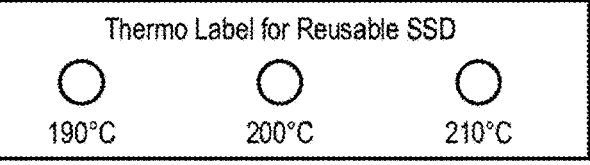
FIGS. 12A to 12D are diagrams illustrating a transition of a state of the label due to a high-temperature annealing treatment in the system according to the embodiment.

FIG. 12A shows a state of the label 402 before the high-temperature annealing treatment is performed. The high-temperature annealing treatment is set to be performed at a temperature of 200° C. or higher and lower than 210° C. In addition, the label 402 is provided with the three portions that irreversibly change, that is, (1) the portion that changes after the temperature reaches 190° C. [left], (2) the portion that changes after the temperature reaches 200° C. [center], and (3) the portion that changes after the temperature reaches 210° C. [right], as described above.

Figure 12B:
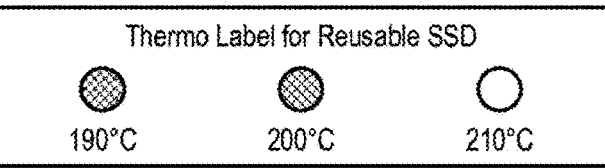

FIG. 12B shows a state of the label 402 after the high-temperature annealing treatment is normally performed at a temperature of 200° C. or higher and lower than 210° C. Since the temperature reached 200° C. in the high-temperature annealing treatment, the portions in (1) and (2) were changed, but the portion (3) was not changed because the temperature did not reach 210° C.

Figure 12C:
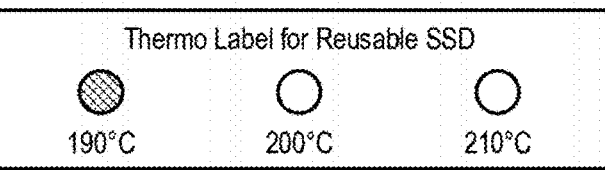

FIG. 12C shows a state of the label 402 after the high-temperature annealing treatment is abnormally performed at a temperature of lower than 200° C. Since the temperature did not reach 200° C. in the high-temperature annealing treatment, the portion in (2) was not changed. Here, an example is shown in which the temperature reaches 190° C. and the portion in (1) is changed.

Figure 12D:
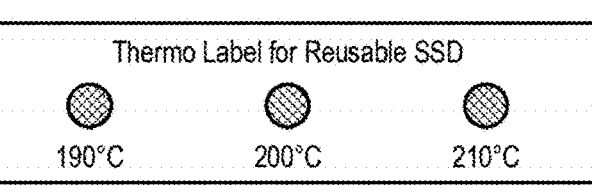

In addition, FIG. 12D shows a state of the label 402 after the high-temperature annealing treatment is abnormally performed at a temperature of 210° C. or higher. Since the temperature reached 210° C. in the high-temperature annealing treatment, all the portions in (1), (2), and (3) were changed.

By affixing the label 402 to the memory package P1, in the system 100, it is possible to determine whether the high-temperature annealing treatment on the memory chip 24 has been performed at a predetermined temperature, and it is possible to determine whether the memory chip 24 has been used in an environment that affects the characteristics of the memory chip 24. That is, the system 100 enables temperature management by use of the label 402.

When it is determined based on the label 402 that the high-temperature annealing treatment has been performed at a temperature of 200° C. or higher and lower than 210° C., the worker or the second chip conveyance device 5 peels off the label 402 and affixes a new label 402 on the memory package P1. The memory package P1 in which the label 402 has been replaced is attached to the drive 22 by the second chip conveyance device 5.

On the other hand, when based on the label 402 it is detected that the high-temperature annealing treatment has been performed at a temperature of lower than 200° C. or 210° C. or higher, the worker or the second chip conveyance device 5 inputs the error information to the host 1. The host 1 that received the error information instructs to discard the memory package P1 or replace the memory package P1 with a preliminary memory package P1. Alternatively, the host 1 may determine to perform the high-temperature annealing treatment again.

Figure 13B:
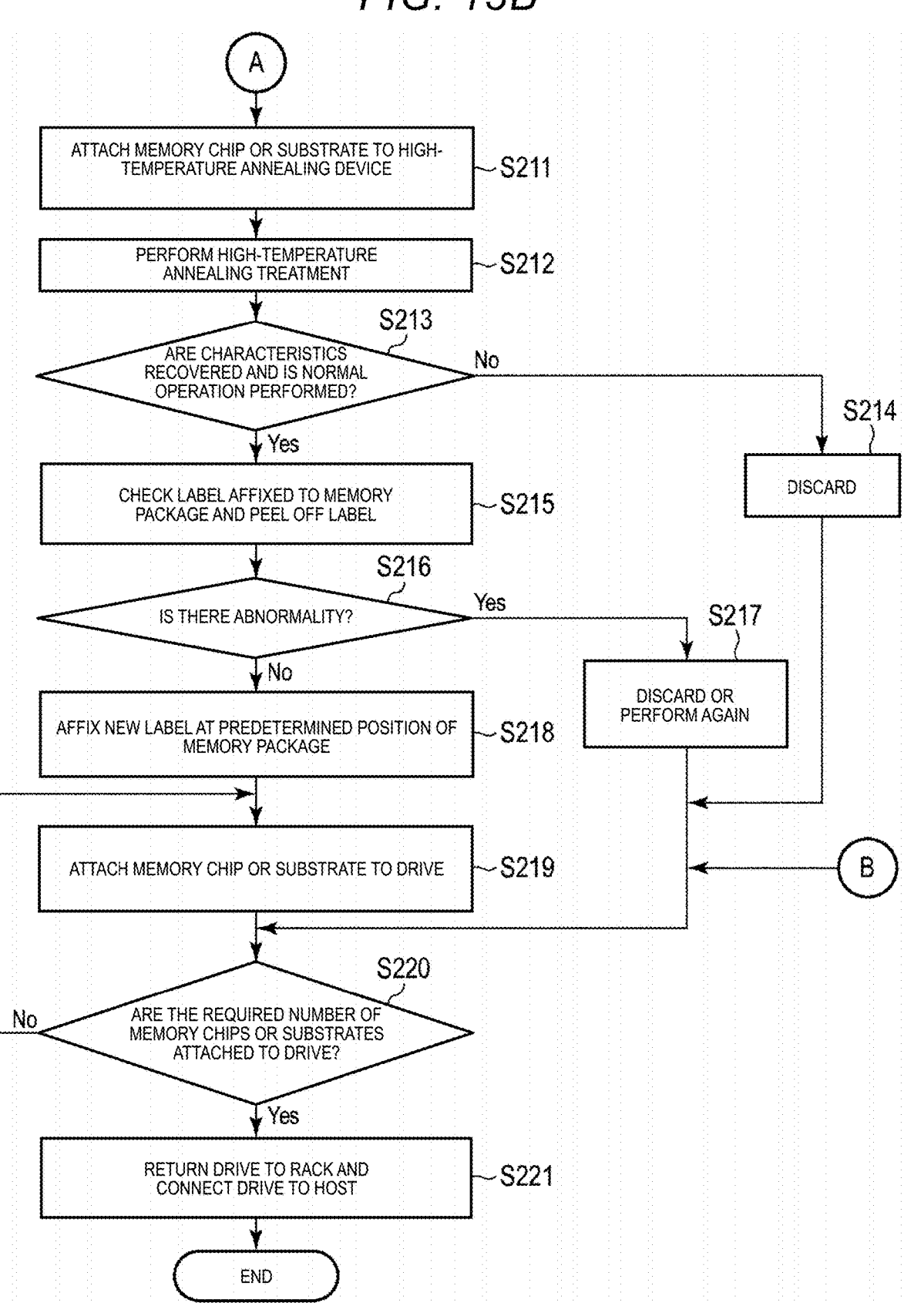
FIG. 13B is a second flowchart showing an operation procedure related to the recovery process of the memory chip including the temperature management by the label in the system according to the embodiment.

FIGS. 13A and 13B are flowcharts showing an operation procedure related to the recovery process of the memory chip 204 including the temperature management using the label in the system 100 according to the embodiment. Steps S201 to S206 of FIG. 13A correspond to steps S101 to S106 of FIG. 10, and the description thereof will be omitted.

The worker or the second chip conveyance device 5 checks the label 402 affixed to the memory package P1, and peels off the label 402 (S207). When the abnormality is detected based on the label 402 by the worker or the second chip conveyance device 5 (S208: Yes), the host 1 instructs to discard the memory chip 24 (S209). In this case, the host 1 may instruct to replace the memory chip 24 with a preliminary memory chip 24. The abnormality here is that the memory chip 24 was used in an environment that affects the characteristics of the memory chip 24. After the memory chip 24 is discarded or replaced, the operation of the system 100 proceeds to step S220 described below. Here, an example is shown in which the label 402 is replaced before the high-temperature annealing treatment is performed, but the high-temperature annealing treatment may be performed with the label 402 affixed on the memory chip 24.

When the abnormality is not detected based on the label 402 (S208: No), the worker or the second chip conveyance device 5 affixes the new label 402 at a predetermined position of the memory package P1 (S210). After the new label 402 is affixed to the memory package P1 by the worker or the second chip conveyance device 5, the host 1 instructs the second chip conveyance device 5 to attach the memory package P1, that is, the memory chip 24 or the substrate 23 to the high-temperature annealing device 6 (S211). Step S211 corresponds to step S107 in FIG. 10. In addition, steps S212 to S214 of FIG. 13B correspond to steps S108, S109, and S111 of FIG. 10, so that the description thereof will be omitted.

When the characteristics of the memory chip 24 are recovered by the high-temperature annealing treatment (S213: Yes), the worker or the second chip conveyance device 5 checks the label 402 affixed to the memory package P1 and peels off the label 402 (S215). When the abnormality is detected based on the label 402 by the worker or the second chip conveyance device 5 (S216: Yes), the host 1 instructs to discard the memory chip 24 or determines to perform the high-temperature annealing treatment again (S217). The host 1 may instruct to perform a replacement of the memory chip 24 with a preliminary memory chip 24 instead of discarding the memory chip 24. The abnormality here means that the high-temperature annealing treatment was not performed at a predetermined temperature. After the memory chip 24 is discarded or replaced, or after the high-temperature annealing treatment is performed again, the operation of the system 100 proceeds to step S220 described below.

When the abnormality is not detected based on the label 402 (S216: No), the worker or the second chip conveyance device 5 affixes the new label 402 at a predetermined position of the memory package P1 (S218). After the new label 402 is affixed to the memory package P1 by the worker or the second chip conveyance device 5, the host 1 instructs the first chip conveyance device 4 to attach the memory package P1, that is, the memory chip 24 or the substrate 23 to the drive 22 (S219). Step S219 corresponds to step S110 in FIG. 10. In addition, since step S220 and step S221 of FIG. 13B correspond to step S112 and step S113 of FIG. 10, the description thereof will be omitted.

As described above, the system 100 can determine whether the high-temperature annealing treatment has been performed on the memory chip 24 at a predetermined temperature by the original label 402 including the portion that irreversibly changes depending on the temperature, and can perform the temperature management of determining whether the memory chip 24 has been used in an environment that affects the characteristics of the memory chip 24.

While certain embodiments have been described, these embodiments have been presented by way of example only, and are not intended to limit the scope of the disclosure. Indeed, the novel embodiments described herein may be embodied in a variety of other forms; furthermore, various omissions, substitutions, and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A chip heat treatment system comprising:
a rack on which a plurality of drives is mountable;
a heat treatment device configured to perform a heat treatment;
one or more conveyance devices; and
a host configured to perform writing and reading of data with respect to one or more memory chips in each of the drives mounted on the rack, wherein the host is configured to:
determine a target memory chip to be subjected to the heat treatment among memory chips in the plurality of drives mounted on the rack;
disable communication with a target drive on which the target memory chip is mounted;
control the one or more conveyance devices to:
dismount the target drive from the rack;
detach a component including the target memory chip from the target drive;
convey the detached component to the heat treatment device;
reattach the component including the target memory chip that has undergone the heat treatment to a drive; and
mount the drive with the component including the target memory chip that has undergone the heat treatment on the rack; and
enable communication with the mounted drive.

2. The chip heat treatment system according to claim 1, wherein the one or more conveyance devices includes:
a drive conveyance device configured to dismount a drive from the rack and mount a drive to the rack;
a first conveyance device configured to detach a component including a memory chip from a drive and attach a component including a memory chip to a drive; and
a second conveyance device configured to convey the component detached by the first conveyance device to the heat treatment device.

3. The chip heat treatment system according to claim 2, wherein the one or more conveyance devices further includes a rack conveyance device configured to convey the rack.

4. The chip heat treatment system according to claim 2, wherein the drive conveyance device is configured to collectively detach a plurality of drives from the rack and collectively attach a plurality of drives to the rack.

5. The chip heat treatment system according to claim 2, wherein each of the heat treatment device, the drive conveyance device, the first conveyance device, and the second conveyance device is movable, and the host is configured to control each of the heat treatment device, the drive conveyance device, the first conveyance device, and the second conveyance device to move to the rack.

6. The chip heat treatment system according to claim 2, wherein each of the drive conveyance device, the first conveyance device, and the second conveyance device includes a robot arm for conveying items picked up by the robot arm.

7. The chip heat treatment system according to claim 1, wherein the heat treatment device includes a connector connectable to the component and is configured to perform an operation test with respect to a memory chip of the component connected to the connector.

8. The chip heat treatment system according to claim 7, wherein the host is configured to issue an instruction to discard the target memory chip when the result of the operation test indicates that the target memory chip is not functioning normally.

9. The chip heat treatment system according to claim 7, wherein the host is configured to disable communication with the target memory chip when the result of the operation test indicates that the target memory chip is not functioning normally and the drive with the component including the target memory that has undergone the heat treatment is mounted on the rack.

10. The chip heat treatment system according to claim 1, wherein the host is configured to copy data stored in the target memory chip to a memory chip in a non-target drive mounted on the rack before disabling the communication with the target memory chip.

11. The chip heat treatment system according to claim 10, wherein the host is configured to erase the data stored in the target memory chip and write data of a predetermined value into each memory cell of the target memory chip before disabling the communication with the target memory chip.

12. The chip heat treatment system according to claim 11, wherein a threshold voltage corresponding to the predetermined value is higher than a lowest threshold voltage among threshold voltages corresponding to a plurality of data values that can be stored in the memory cell, and lower than a highest threshold voltage among the threshold voltages corresponding to the plurality of data values that can be stored in the memory cell.

13. The chip heat treatment system according to claim 11, wherein the host is configured to issue a data erasure certificate with respect to the target memory chip after the data stored in the target memory chip is erased.

14. The chip heat treatment system according to claim 1, wherein the host is configured to determine a performance level of the target memory chip, and determine a temperature and a duration of the heat treatment by the heat treatment device based on the performance level.

15. The chip heat treatment system according to claim 1, wherein the host is configured to determine a performance level of a memory chip in a drive mounted on the rack, and determine a memory chip of which performance level drops below a threshold level to be the target memory chip.

16. The chip heat treatment system according to claim 15, wherein the host is configured to determine the performance level of the memory chip based on at least one of a read latency, a write latency, a read throughput, and a write throughput.

17. The chip heat treatment system according to claim 15, wherein the host is configured to determine the target memory chip based on at least one of an amount of time that has elapsed since a last heat treatment to the memory chip and a number of times the heat treatment has been performed with respect to the memory chip.

18. The chip heat treatment system according to claim 1, wherein the host is configured to control the one or more conveyance devices to affix, to the component including the target memory chip, a label having an indicator that changes state in an irreversible manner when the label is subjected to a temperature that is above a predetermined temperature, and convey the component with the label to the heat treatment device.

19. The chip heat treatment system according to claim 18, wherein the host is configured to determine whether or not the heat treatment has been properly performed with respect to the target memory chip based on a state of the indicator.

20. The chip heat treatment system according to claim 1, wherein the host is configured to control the one or more conveyance devices to affix, to the component including the target memory chip that has undergone the heat treatment, a label having an indicator that changes state in an irreversible manner in when subjected to a temperature that is above a predetermined temperature.

* * * * *